(12) United States Patent
Rhee et al.

(10) Patent No.: US 7,702,990 B2
(45) Date of Patent: Apr. 20, 2010

(54) METHOD AND APPARATUS FOR PERFORMING DATA BUFFERING FOR REED-SOLOMON (R-S) CODING/DECODING IN A MOBILE COMMUNICATION SYSTEM

(75) Inventors: Jong-Hun Rhee, Suwon-si (KR); Min-goo Kim, Yongin-si (KR); Jong-Han Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1069 days.

(21) Appl. No.: 11/368,533

(22) Filed: Mar. 7, 2006

(65) Prior Publication Data

US 2006/0253442 A1 Nov. 9, 2006

(30) Foreign Application Priority Data

Mar. 7, 2005 (KR) ...................... 10-2005-0018885

(51) Int. Cl.
*H03M 13/00* (2006.01)
(52) U.S. Cl. ...................................... 714/784; 714/785
(58) Field of Classification Search ................. 714/752, 714/781, 784, 785
See application file for complete search history.

(56) References Cited

U.S. PATENT DOCUMENTS

| 5,742,619 | A | * | 4/1998 | Hassan ........................ 714/755 |
| 5,809,042 | A | * | 9/1998 | Nakamura et al. .......... 714/756 |
| 5,838,728 | A | * | 11/1998 | Alamouti et al. ............ 375/265 |
| 6,081,919 | A | * | 6/2000 | Fujiwara et al. ............. 714/755 |
| 7,222,287 | B2 | * | 5/2007 | Kondou ....................... 714/784 |
| 7,346,352 | B2 | * | 3/2008 | Colban et al. ............... 455/442 |

FOREIGN PATENT DOCUMENTS

KR 1020050092996 9/2005

* cited by examiner

*Primary Examiner*—Esaw T Abraham
(74) *Attorney, Agent, or Firm*—Roylance, Abrams, Berdo & Goodman, L.L.P.

(57) ABSTRACT

A method and apparatus for performing Reed-Solomon (R-S) coding in a mobile communication system supporting a broadcast and multicast (BCMC) service are provided, where a determination is made as to whether a change in a broadcast overhead message (BOM) exist including information with parameters used for the BCMC service. A position of data in a new channel encoder buffer is calculated at a time when the BOM is changed. The channel encoder buffer is filled with predetermined data in an interval ranging from a start point of a buffer comprising data in the change point of the BOM to a point preceding a point of data first transmitted according to the changed BOM.

12 Claims, 12 Drawing Sheets

METHOD AND APPARATUS FOR PERFORMING DATA BUFFERING FOR REED-SOLOMON (R-S) CODING/DECODING IN A MOBILE COMMUNICATION SYSTEM

PRIORITY

This application claims the benefit under 35 U.S.C. §119 (a) of Korean Patent Application filed in the Korean Intellectual Property Office on Mar. 7, 2005 and assigned Serial No. 2005-18885, the entire disclosure of which is hereby incorporated by reference.

BACKGROUND OF THE INVENTION

1. Field of the Invention

The present invention relates generally to a channel coding method and apparatus. More particularly, the present invention relates to a method and apparatus for preventing a performance loss of a Reed-Solomon (R-S) code caused when a time division multiplexing point serviced between a transmitter and a receiver is changed in a Code Division Multiple Access (CDMA) mobile communication system using R-S codes.

2. Description of the Related Art

A mobile communication system has evolved from an early system that provides voice service into an advanced system capable of providing data service. The mobile communication system has now developed into a system that can provide broadcast service together with various data services. The system providing broadcast service is under standardization in a 3rd Generation Partnership Project 2 (3GPP2) group. Broadcast service proposed in the 3GPP2 group is called "Broadcast and Multicast (BCMC) Service" in a CDMA2000 1x Rev. D standard. In addition to the CDMA2000 1x Rev. D standard, a High Rate Broadcast-Multicast Packet Data (HRPD) Rev. A standard for the synchronous CDMA system also provides BCMC Service.

In the following description, BCMC service proposed in both the CDMA2000 1x Rev. D standard and the HRPD Rev. A standard for the CDMA system will be referred to as "broadcast service."

The broadcast service is provided in which broadcast data based on a frame having a period of, for example, 20 ms is transmitted by Time Division Multiplexing (TDM). For channel coding, the broadcast service can use an R-S code, which is an error correction code, well known as an outer code, aside from an inner code such as a convolutional code or a turbo code. Accordingly, if the TDM scheme is used in transmitting broadcast data, a receiver selectively receives a minimum number of frames, contributing to improvement in the receiver's reception performance. However, in order to prevent possible consecutive transmission errors of broadcast data, the broadcast service uses the R-S code as currently proposed in the CDMA2000 1x Rev. D standard. An exemplary implementation of the present invention relates to a channel coding method. The channel coding method improves positions of information data sequentially input to an encoder when some of channel coded bits are defective, thereby preventing a loss of the information data and improving the performance. In particular, the present invention relates to a physical channel format used for transmission based on a cdma2000 High Rate Broadcast-Multicast Packet Data (HRPD) standard for the synchronous CDMA mobile communication system, and efficiently encodes the R-S code used for Broadcast/Multicast Service (BCMCS), thereby to prevent a performance loss of the R-S code caused when a time division multiplexing point serviced between a transmitter and a receiver is changed. This technology is not limited only to the CDMA2000 HRPD standard for the synchronous CDMA mobile communication system, but can be generally applied when a portion of channel coded data cannot be transmitted. A description will be made based on the CDMA2000 High Rate Broadcast-Multicast Packet Data (HRPD) standard (in this specification, it will be referred to as "BCMC" unless stated otherwise).

A general BCMC transmitter has an R-S error control block buffer for each individual logical channel. For a plurality of logical channel bits input to the R-S error control block buffer, R-S coded symbols for each individual channel are output to a TDM multiplexer. The TDM multiplexer TDM-multiplexes the input symbols for each individual logical channel. The channel symbols generated by the TDM multiplexer undergo additional transmission coding and modulation processes through an inner encoder before being transmitted.

Figure 1:
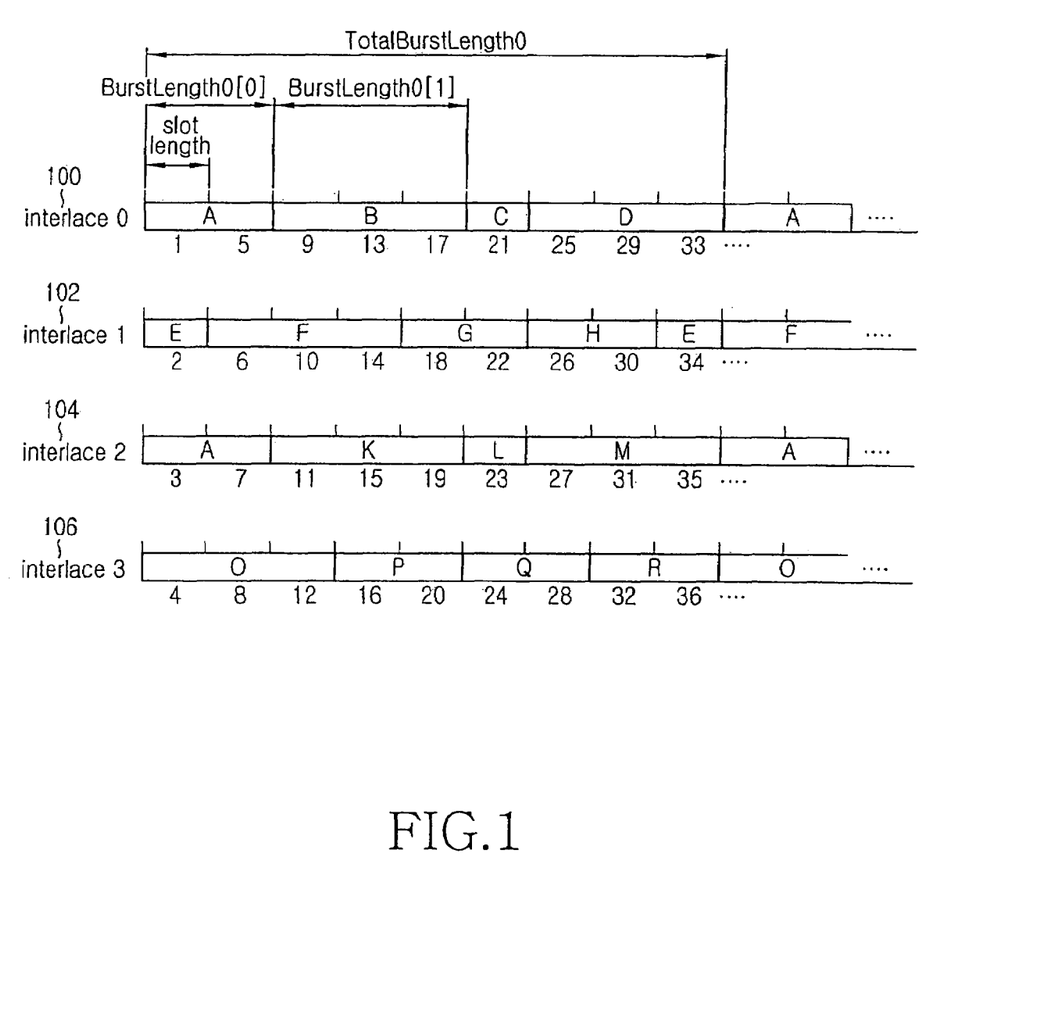
FIG. 1 is a diagram illustrating an exemplary TDM transmission method according to a BCMC standard.

A general BCMC receiver includes a process of demodulating the data transmitted by the TDM multiplexer of the BCMC transmitter, and an R-S decoding process of performing inner decoding on the demodulated data and then inputting a desired logical channel to its R-S error control block buffer using a logical channel selector. With reference to FIG. 1, a description will now be made of a transmission method based on the BCMC standard.

FIG. 1 is a diagram illustrating an exemplary TDM transmission method according to the BCMC standard. The TDM transmission method is classified according to interlace, which each interlace is allocated Multiplex and BurstLength. The term "interlace" refers to a slot of a physical channel that is transmitted in units of time slots in a 1x EV-DO network, and the term "multiplex" refers to an index obtained by logically dividing the interlace. In addition, the term "BurstLength" refers to the number of repeated transmissions for a logical broadcast channel created with the interlace and the multiplex. Each interlace is transmitted in units of slots, and numerals under the interlace represent corresponding slot indexes. In addition, alphabets A, B, C, . . . shown in FIG. 1 represent logical channels. In FIG. 1, an interlace-0 100 includes 4 multiplexed channels A, B, C and D; an interlace-1 102 includes 4 multiplexed channels E, F, G and H; an interlace-2 104 includes 4 multiplexed channels A, K, L and M; and an interlace-3 106 includes 4 multiplexed channels O, P, Q and R. A length of each multiplexed channel included in the interlace-0 100 is set to BurstLength0[i] (where i={0, 1, 2, 3}). TotalBurstLength is a sum of all BurstLengths in each individual interlace.

Figure 2:
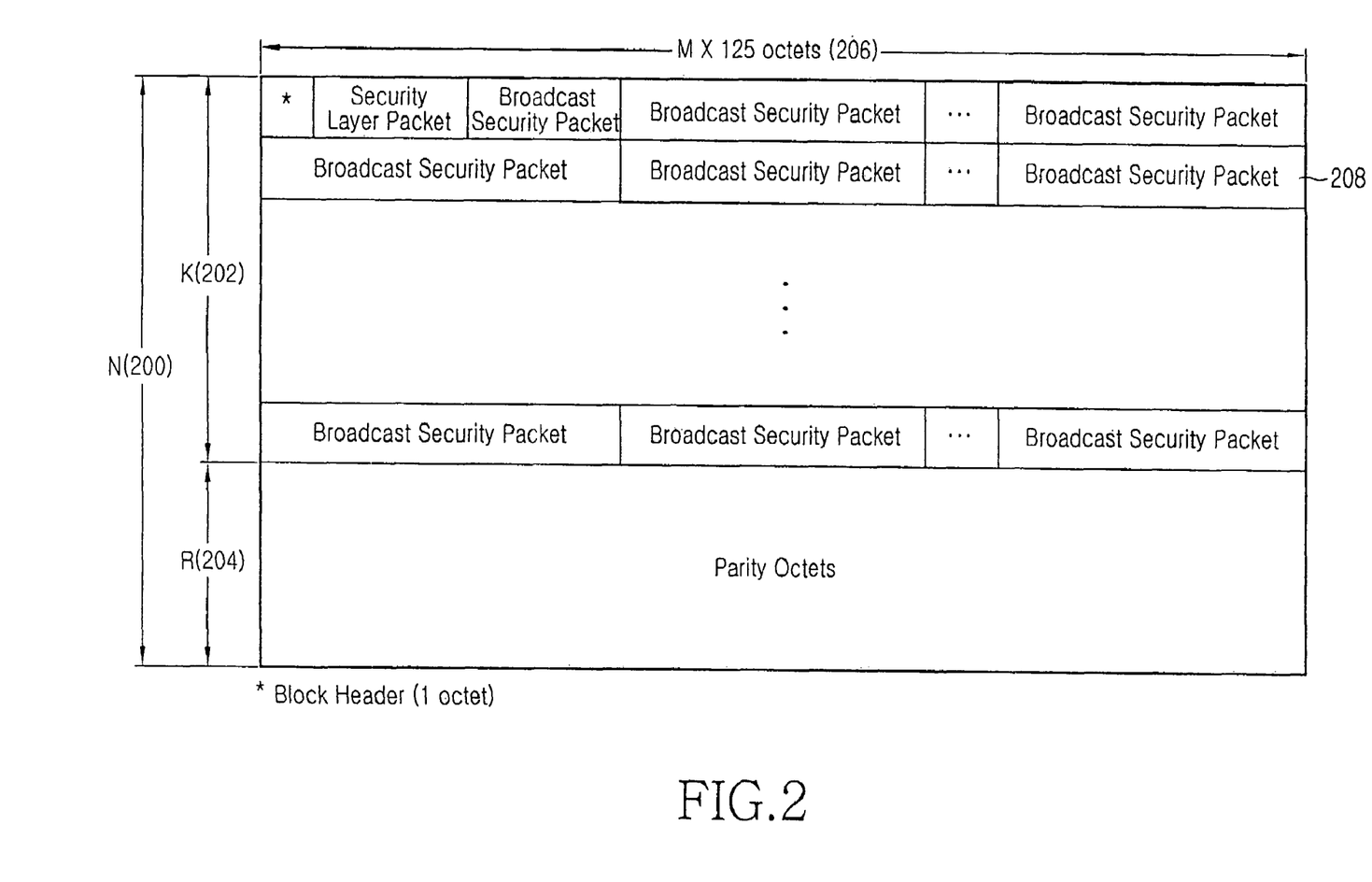
FIG. 2 is a diagram illustrating a structure of an R-S error control block buffer for one logical channel when an R-S code which is an outer code is used in BCMC.

FIG. 2 is a diagram illustrating a structure of an R-S error control block buffer for one logical channel when an R-S code, which is an outer code, is used in BCMC.

In FIG. 2, N (200) denotes a length of an R-S code, K (202) denotes a length of an information symbol, and R (204) denotes a length of a parity symbol. In addition, M (206) denotes a value corresponding to a size of a horizontal axis of the block, where M={1, 2, . . . , 16}. In FIG. 2, the actual data before R-S coding has a size of K×M, and a parity portion created after the R-S coding has a size of R×M.

Broadcast security packets 208 are transmitted to a receiver over one logical channel in order of arrival at the R-S error control block buffer (not shown), and the broadcast security packets 208 positions in the logical channel are shown in FIG. 1. A relationship between positions of the broadcast security packets in the R-S error control block buffer and their actual transmission time points in one logical channel is defined as follows.

1) Assuming that an absolute time 0 (for example, 1980.01.01) is defined, the current structure of a TDM logical channel has been continuously maintained from the absolute time 0 to the present time.

2) For a logical channel desired to be sent, a first broadcast security packet in the R-S error control block buffer starts transmitting at a slot first allocated after the absolute time 0.

3) Assuming that the transmission started by the foregoing operation has continued up to the present time, the data in a position of a broadcast security packet in the R-S error control block buffer, which must be sent at the present time, is transmitted in a corresponding slot interval.

Several parameters for the BCMC transmission are delivered by a Broadcast Overhead Message (BOM). A description of the BOM will be made below with reference to FIG. 3.

In the BCMC service, a base station previously provides position information of broadcast data to a receiver through a BOM. The base station should necessarily transmit a control channel to the receiver every 256 slots, and transmit a BOM every 7 slots. The BOM includes BurstLength and TotalBurstLength.

Figure 3:
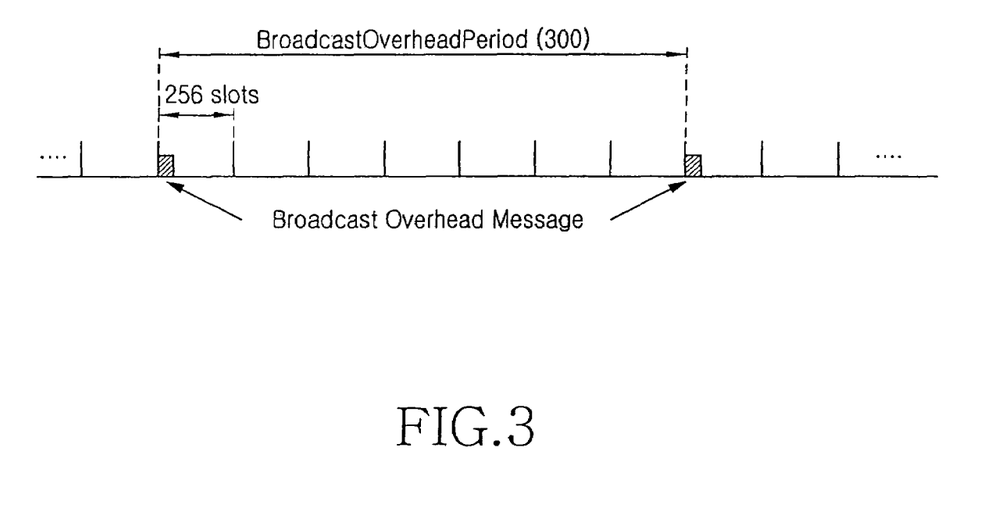
FIG. 3 is a diagram illustrating a transmission time of a BOM which is additional information used for providing BCMC.

FIG. 3 is a diagram illustrating a transmission time of a BOM which is additional information used for providing BCMC. The BOM, as shown in FIG. 3, is delivered basically at intervals of 7 BroadcastOverheadPeriods×256 slots=3 seconds. The BCMC can perform allocation, deallocation and position-shifting on each logical channel by modifying the BOM.

In the BCMC standard, the BOM is delivered as shown in FIG. 3. The BOM is repeatedly transmitted with the same value as long as TDM information is maintained. However, if the TDM information is changed, the BOM is transmitted with a value different from the value transmitted in the previous interval. Accordingly, when the TDM information is changed by the BOM, an R-S decoder cannot perform R-S decoding.

Figure 4:
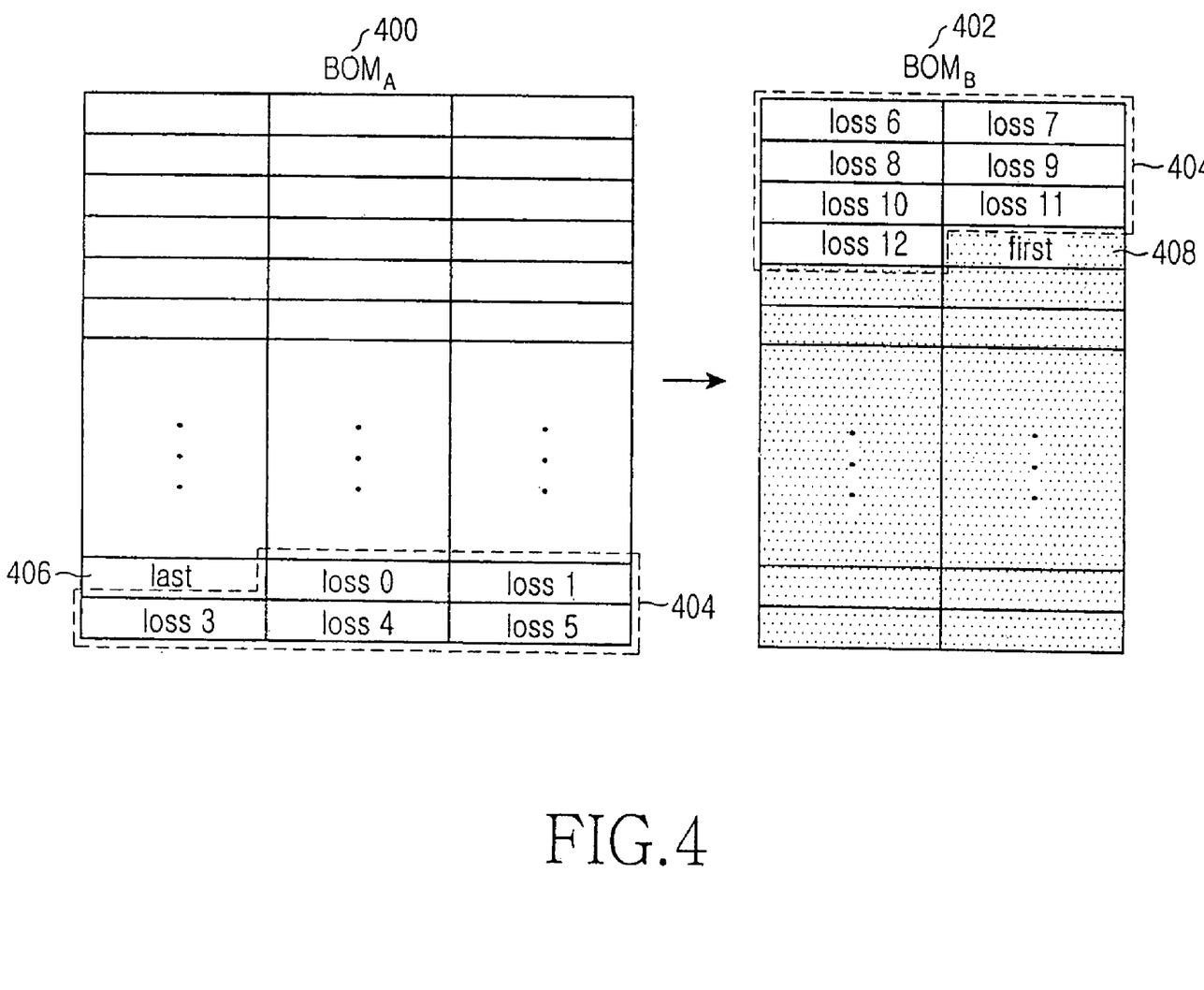
FIG. 4 is a diagram illustrating an R-S error control block transmission problem caused by a change in BOM format according to the conventional art.

FIG. 4 is a diagram illustrating an R-S error control block transmission problem caused by a change in BOM format according to conventional art.

Transmission points of the data in an R-S error control block buffer are determined on the assumption that first transmission always starts after the absolute time 0. Referring to FIG. 4, based on the format defined in a received BOM, a receiver determines which position of the R-S error control block buffer the received data is located. Therefore, if the BOM is changed from $BOM_A$ 400 to $BOM_B$ 402, a position of the data last transmitted according to the format defined in the $BOM_A$ 400, which is a BOM before the change, in the R-S error control block buffer, and a position of the data first transmitted according to the format defined in the $BOM_B$ 402, which is a BOM after the change, in the R-S error control block buffer, may not be consecutive to each other in block 404. In FIG. 4, a 'last' packet 406 represents the packet last transmitted according to the format defined in the BOMA 400, and a 'first' packet 408 represents the packet first transmitted according to the format defined in the $BOM_B$ 402. However, if a transmitter transmits data after encoding the data such that data packets in R-S error control blocks before and after the change in BOM are consecutive, the receiver may lose the packets transmitted by the transmitter in a loss interval 404. That is, if the transmitter fills the loss interval 404 with data, the data in the loss interval 404 is not delivered to the receiver because the data is not actually transmitted.

In the conventional art, the change in the additional information causes a loss interval 404 of loss0~loss12, in which data is not transmitted. As a result, performance is deteriorated because the receiver loses the data in this interval and cannot perform outer decoding even on the remaining data area of FIG. 4.

Accordingly, there is a need for an improved method and apparatus that prevents loss of information data transmitted and improves performance in a mobile communication system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for improving positions of information data being sequentially input to an R-S encoder, when a portion of coded data cannot be transmitted.

According to an aspect of exemplary embodiments of the present invention, there is provided a method for performing Reed-Solomon (R-S) coding in a mobile communication system supporting a broadcast/multicast (BCMC) service, where a determination is made as to whether a change in a broadcast overhead message (BOM) exists comprising additional information with parameters used for the BCMC service, a position of data in a new channel encoder buffer is calculated at a time when the BOM is changed, and the channel encoder buffer is filled with predetermined data in an interval ranging from a start point of a buffer comprising data in the change point of the BOM to a point preceding a point of data first transmitted according to the changed BOM.

According to another aspect of the present invention, there is provided an apparatus for performing Reed-Solomon (R-S) coding in a mobile communication system supporting a broadcast/multicast (BCMC) service, where an outer encoder encodes logical channel bits into logical channel symbols to provide the BCMC service, a time division multiplexing (TDM) multiplexer TDM-multiplexes the channel symbols, and a controller determines whether there is a change in a broadcast overhead message (BOM) comprising additional information with parameters used for the BCMC service, a position of data in a new channel encoder buffer is calculated at the time when the BOM is changed, and immediately after a change point in the BOM, the channel encoder buffer is filled with predetermined data in an interval ranging from a start point of a buffer comprising data in the change point of the BOM is included, till a point preceding a point of data to be first transmitted in the new channel encoder buffer.

According to a further aspect of an exemplary embodiment of the present invention, there is provided a method for performing Reed-Solomon (R-S) decoding in a mobile communication system supporting a broadcast/multicast (BCMC) service, where a determination is made as to whether a change in a broadcast overhead message (BOM) exists including additional information with parameters used for the BCMC service, a position of data in a new channel decoder buffer is calculated at a time when the BOM is changed, performing an erasure process on the data a previous channel decoder buffer failed to receive until a change point of the BOM, and immediately after the change in the BOM, filling the channel decoder buffer with predetermined data in an interval ranging from a start point of a buffer comprising data in the change point of the BOM to a point preceding a point of data first received according to the changed BOM.

According to yet another aspect of an exemplary embodiment of the present invention, there is provided an apparatus for performing Reed-Solomon (R-S) decoding in a mobile communication system supporting a broadcast/multicast (BCMC) service, where a logical channel selector converts a received BCMC service signal into logical channel symbols to receive the BCMC service, an outer decoder decodes a plurality of logical channel symbols output from the logical channel selector into a plurality of logical channel bits, and a controller determines whether a change in a broadcast overhead message (BOM) exists comprising additional information with parameters used for the BCMC service, a position of data in a new channel decoder buffer is calculated at the time when the BOM is changed, an erasure process is performed on the data that the channel decoder buffer failed to receive until a change point of the BOM, and immediately after the change point, the channel decoder buffer is filled with predetermined data in an interval ranging from a start point of a buffer comprising data in the change point of the BOM to a point preceding a point of data first received according to the changed BOM.

According to still another aspect of an exemplary embodiment of the present invention, there is provided a method for performing Reed-Solomon (R-S) coding in a mobile communication system supporting a broadcast/multicast (BCMC) service, where a determination is made as to whether there is a change in a broadcast overhead message (BOM) comprising additional information with parameters used for providing the BCMC service; a position of data in a new channel encoder buffer is calculated at a time when the BOM is changed, a determination is made as to whether data before the change in the BOM overlaps with data after the change in the BOM, and if the data overlaps each other, the channel encoder buffer is filled with predetermined data up to a point preceding a packet after the change in the BOM.

According to still another aspect of an exemplary embodiment of the present invention, there is provided a method for performing Reed-Solomon (R-S) decoding in a mobile communication system supporting a broadcast/multicast (BCMC) service, where a determination is made as to whether there is a change in a broadcast overhead message (BOM) comprising additional information with parameters used for the BCMC service; a position of data in a new channel decoder buffer is calculated at a time when the BOM is changed, a determination is made as to whether data before the change in the BOM overlaps with data after the change in the BOM, if the data overlaps each other, an erasure process is performed on the data that the channel decoder buffer failed to receive until a position of a packet before the change in the BOM, and after the erasure process, the channel decoder buffer is filled with predetermined data up to a point of data first received at the new channel decoder buffer, immediately after the change point.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding to the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In an exemplary implementation, an exemplary BCMC method and apparatus for preventing a loss of information data is provided when a portion of coded data cannot be transmitted, thereby improving performance.

A description of an exemplary embodiment of the present invention will be made separately for a case where a format of an R-S error control block is changed when a BOM is changed and a second case where the format of the R-S error control block is not changed. In the case where the format of the R-S error control block is changed, an encoder should necessarily perform an initialization process before and after the change. However, in the second case where the format of the R-S error control block is not changed, the encoder does not necessarily need to be initialized.

Figure 5:
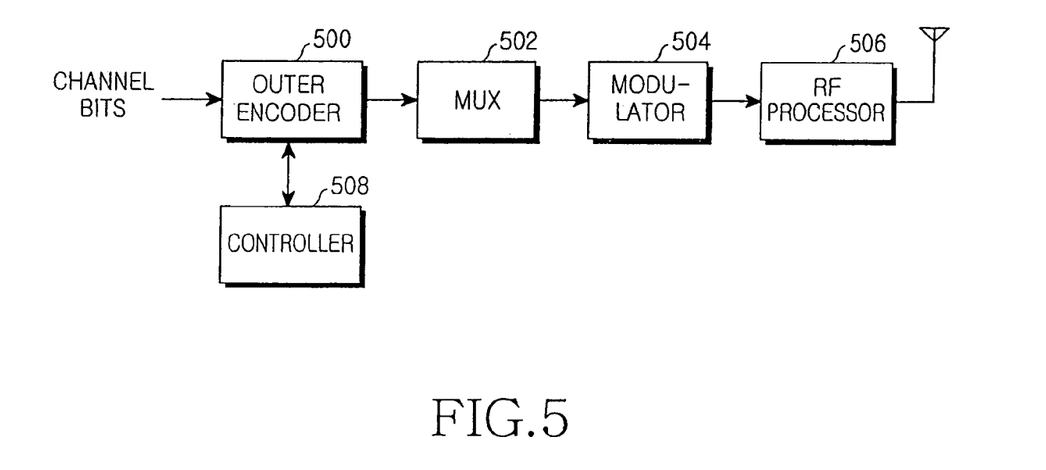
FIG. 5 is a block diagram illustrating a structure of a transmitter for providing BCMC according to an exemplary embodiment of the present invention.

FIG. 5 is a block diagram illustrating a structure of a transmitter for providing BCMC according to an exemplary embodiment of the present invention. With reference to FIG. 5, a description will now be made of a structure and operation of the transmitter according to an exemplary embodiment of the present invention.

Referring to FIG. 5, logical channel bits are input to an outer encoder 500 for R-S encoding. Logical channel symbols generated in the outer encoder 500 by encoding the input logical channel bits are input to a TDM multiplexer 502 where the logical channel symbols are multiplexed. The outer encoder 500, although not illustrated, includes a plurality of buffers for encoding a plurality of input logical channel bits. The channel symbols output from the TDM multiplexer 502 are modulated by a modulator 504 and then up-converted by a radio frequency (RF) processor 506 before being transmitted. A controller 508 controls the outer encoder 500 according to an exemplary embodiment of the present invention to change a format of an R-S error control block for R-S coding when a BOM is changed. Further, the controller 508 calculates a transmission time of data in the R-S error control block assuming that transmission of a particular BOM has continued from a reference time of the system until a present time. In addition, according to an exemplary embodiment of the present invention, the controller 508 performs an ERASURE process or a KNOWN process with the bits predefined between a transmitter and a receiver, instead of transmitting information data for a particular area in the R-S error control block generated at the point where the BOM is changed.

Figure 6:
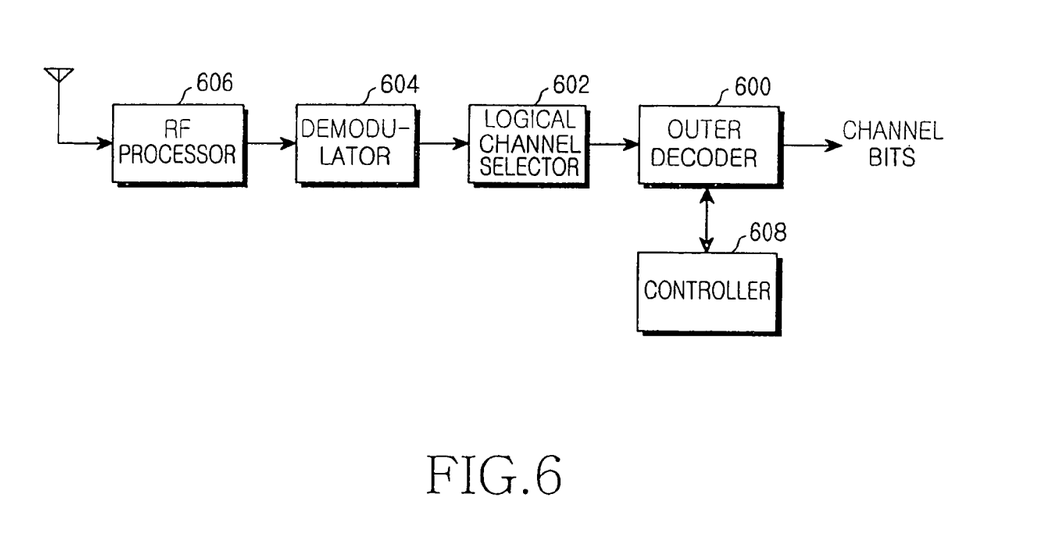
FIG. 6 is a block diagram illustrating a structure of a receiver for receiving BCMC according to an exemplary embodiment of the present invention.

FIG. 6 is a block diagram illustrating a structure of a receiver for receiving BCMC according to an exemplary embodiment of the present invention. With reference to FIG. 6, a description will now be made of a structure and operation of the receiver according to an exemplary embodiment of the present invention.

Referring to FIG. 6, a BCMC signal received from an antenna is down-converted by an RF processor 606 and then output to a demodulator 604. The demodulator 604 demodulates the input BCMC signal and outputs the demodulated signal to a logical channel selector 602 in its rear stage. The logical channel selector 602 divides the demodulated signal into logical channels, and an outer decoder 600 performs R-S decoding on each of the logical channels. The outer decoder 600, although not illustrated, includes a plurality of buffers for decoding the logical channel symbols output from the logical channel selector 602 into logical channel bits. According to an exemplary embodiment of the present invention, a controller 608 controls the outer decoder 600 to change a format of an R-S error control block for R-S coding when a BOM is changed. In addition, the controller 608 controls the outer decoder 600 to perform an ERASURE process on an ERASURE area generated in an interval where a BOM is changed. On the contrary, the controller 608 controls the outer decoder 600 such that the outer decoder 600 fills a KNOWN area generated in the interval where the BOM is changed with information bits predefined between the transmitter and the receiver, before performing decoding.

Figure 7:
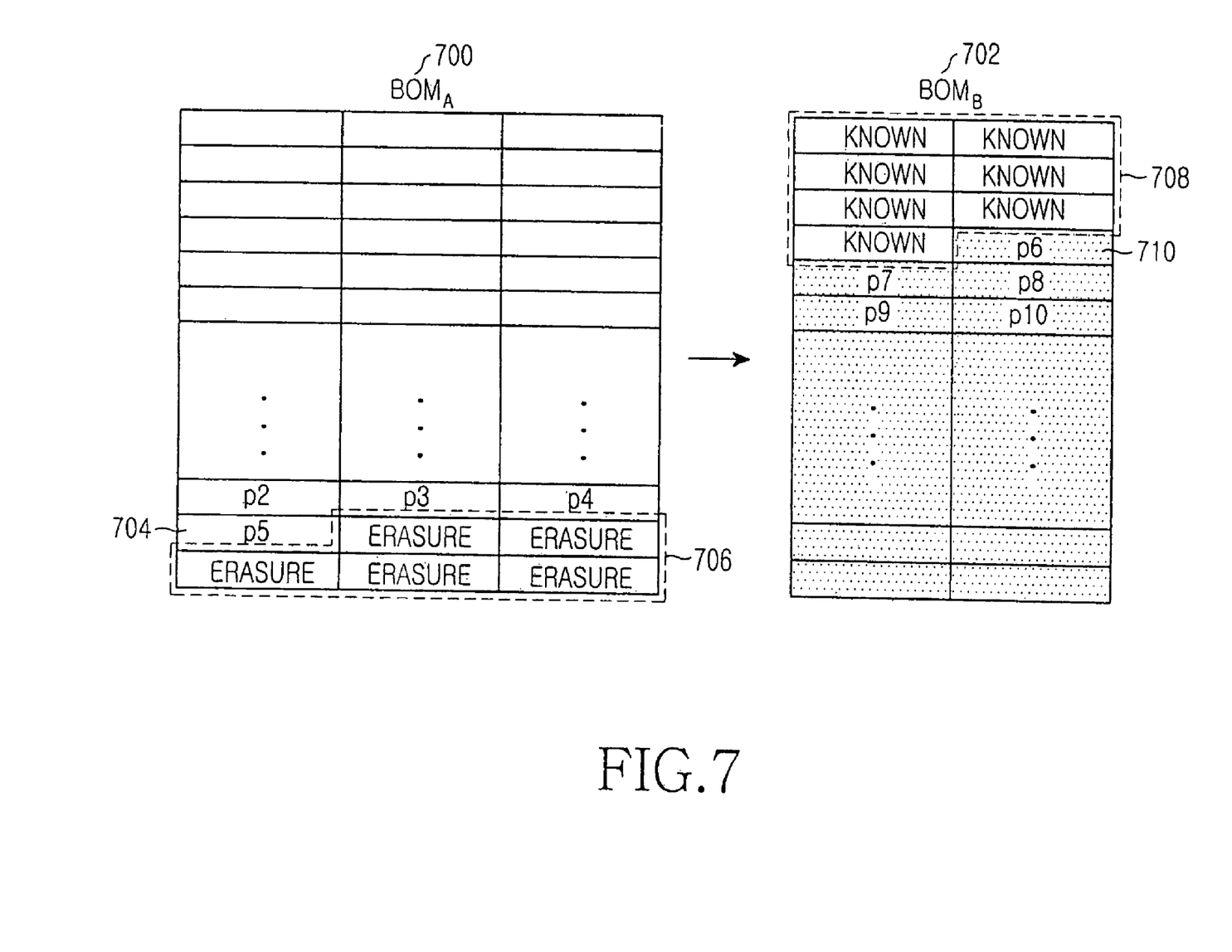
FIG. 7 is a diagram illustrating a coding scheme in which no packet loss occurs even though a BOM is changed in a wireless broadcast system employing R-S coding according to an exemplary embodiment of the present invention.

FIG. 7 is a diagram illustrating a coding scheme in which no packet loss occurs even though a BOM is changed in a wireless broadcast system employing R-S coding according to an exemplary embodiment of the present invention.

Referring to FIG. 7, $BOM_A$ 700 and $BOM_B$ 702 are parameters, each of which is additional information for BCMC transmission. In BCMC, allocation, deallocation and position-shifting of logical channels can be controlled using the BOM. In a BCMC transmitter, when a BOM format is changed from the $BOM_A$ 700 to the $BOM_B$ 702, a p5 packet 704 is last transmitted according to a format of the $BOM_A$ 700 and a p6 packet 710 is transmitted first according to a format of the $BOM_B$ 702. In this instance, the transmitter uses the format of the $BOM_A$ 700 only for transmission of the p5 packet 704 and its preceding packets and uses the format of the $BOM_B$ 702 for transmission of the p6 packet 710 and its succeeding packets. That is, an ERASURE area 706 and a KNOWN area 708 of FIG. 7 are the portions not transmitted in the transmitter. The KNOWN area 708 of the information data area is actually filled with the bits (for example all '0' bits) predefined between the transmitter and the receiver. The transmitter defines the KNOWN area as an area ranging from a start point of a block buffer in which data to be transmitted according to the changed BOM format is included to a point preceding the point where data is to be actually transmitted according to the changed BOM format.

The receiver may detect the change in the BOM format and perform R-S outer decoding accordingly. In the decoding process, when the BOM format is changed from the $BOM_A$ 700 to the $BOM_B$ 702, the receiver performs an ERASURE process on the ERASURE area 706, which is a data area before the change in the BOM format to the $BOM_B$ 702, as shown in FIG. 7.

A data area after the change in the BOM format to the $BOM_B$ 702, which is denoted by the KNOWN area 708, undergoes a coding process with the predefined bits in the transmitter (for example, the data area is filled with '0's). An area following the p6 packet 710, which is an area except for the KNOWN area 708, is then delivered to the receiver. The receiver then fills the KNOWN area 708 with the predefined bits before performing a decoding process. That is, the receiver, according to an exemplary embodiment of the present invention, defines the KNOWN area as an area ranging from a start point of a block buffer in which data received according to the changed BOM format is included to a point preceding the point where data is actually received according to the changed BOM format.

Operations performed in the controllers of the transmitter and the receiver will now be described in brief. The controller 508 of the transmitter does not transmit the information data desired to be delivered in the ERASURE area 706 and the KNOWN area 708 generated in the interval where the BOM is changed. Therefore, the controller 508 inserts the consecutive data in the areas of p2, p3, p4, p5, p6, p7, p8, p9, p10, . . . before transmission. The controller 608 of the receiver performs an ERASURE process on the ERASURE area 706 generated in the interval where the BOM is changed, in the decoding process, and fills the KNOWN area 708 with the information bits predefined by the transmitter before performing the decoding.

Figure 8:
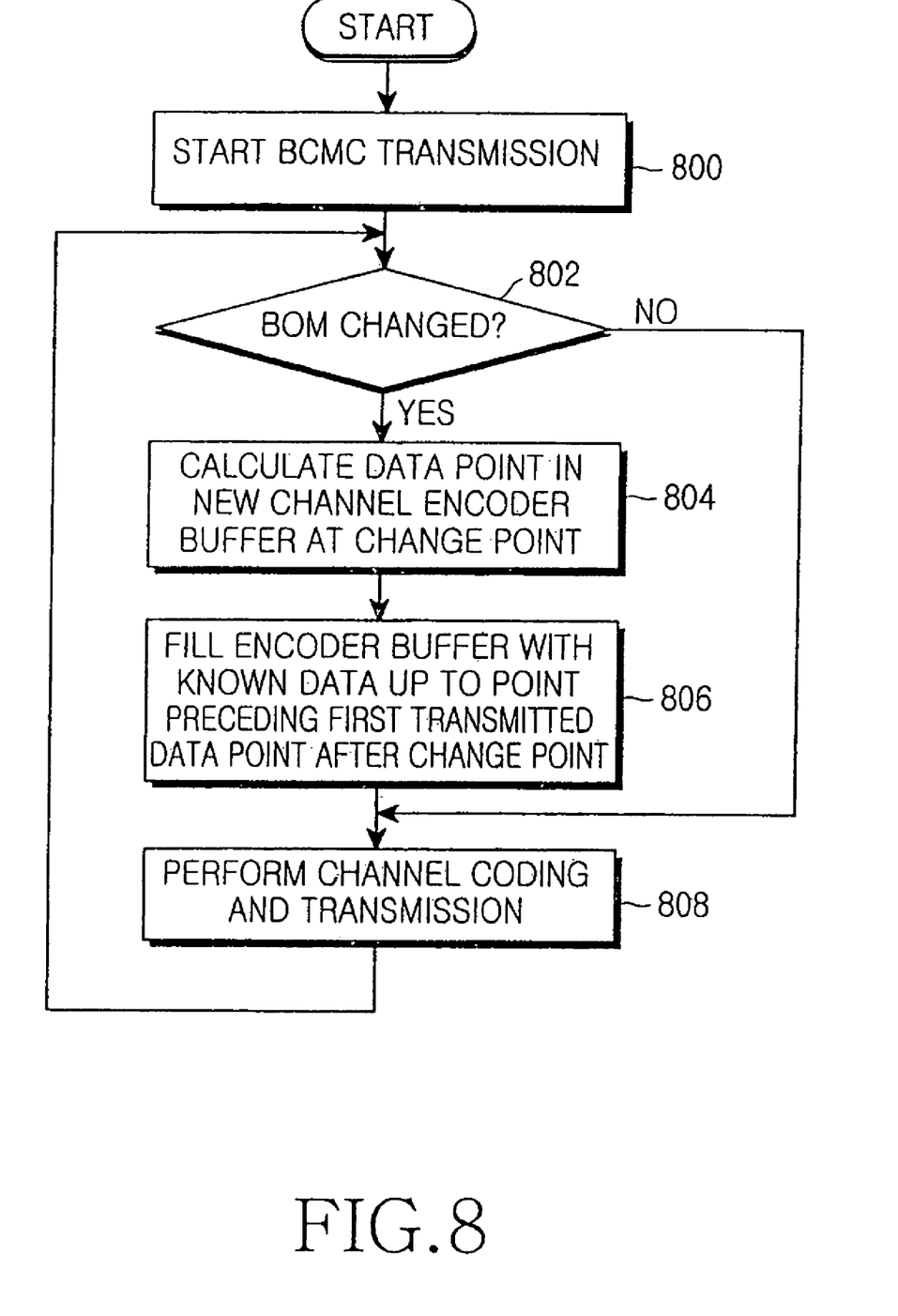
FIG. 8 is a flowchart illustrating an operation of a transmitter's controller when a format of an R-S error control block is changed according to an exemplary embodiment of the present invention.

FIG. 8 is a flowchart illustrating an operation of a transmitter's controller 508 when a format of an R-S error control block is changed according to an exemplary embodiment of the present invention.

Referring to FIG. 8, a controller 508 of a transmitter starts BCMC transmission in step 800, and determines in step 802 whether a BOM is changed. If a determination is made in step 802 that the BOM is changed, the controller 508 calculates in step 804 data points in a new channel encoder buffer at a point the BOM is changes. In step 806, the controller 508 fills the encoder buffer with KNOWN data 708 up to the point preceding a first transmitted data point in the new channel encoder buffer, immediately after the change point of the BOM. The controller 508 performs channel coding and transmission operations in step 808.

Figure 9:
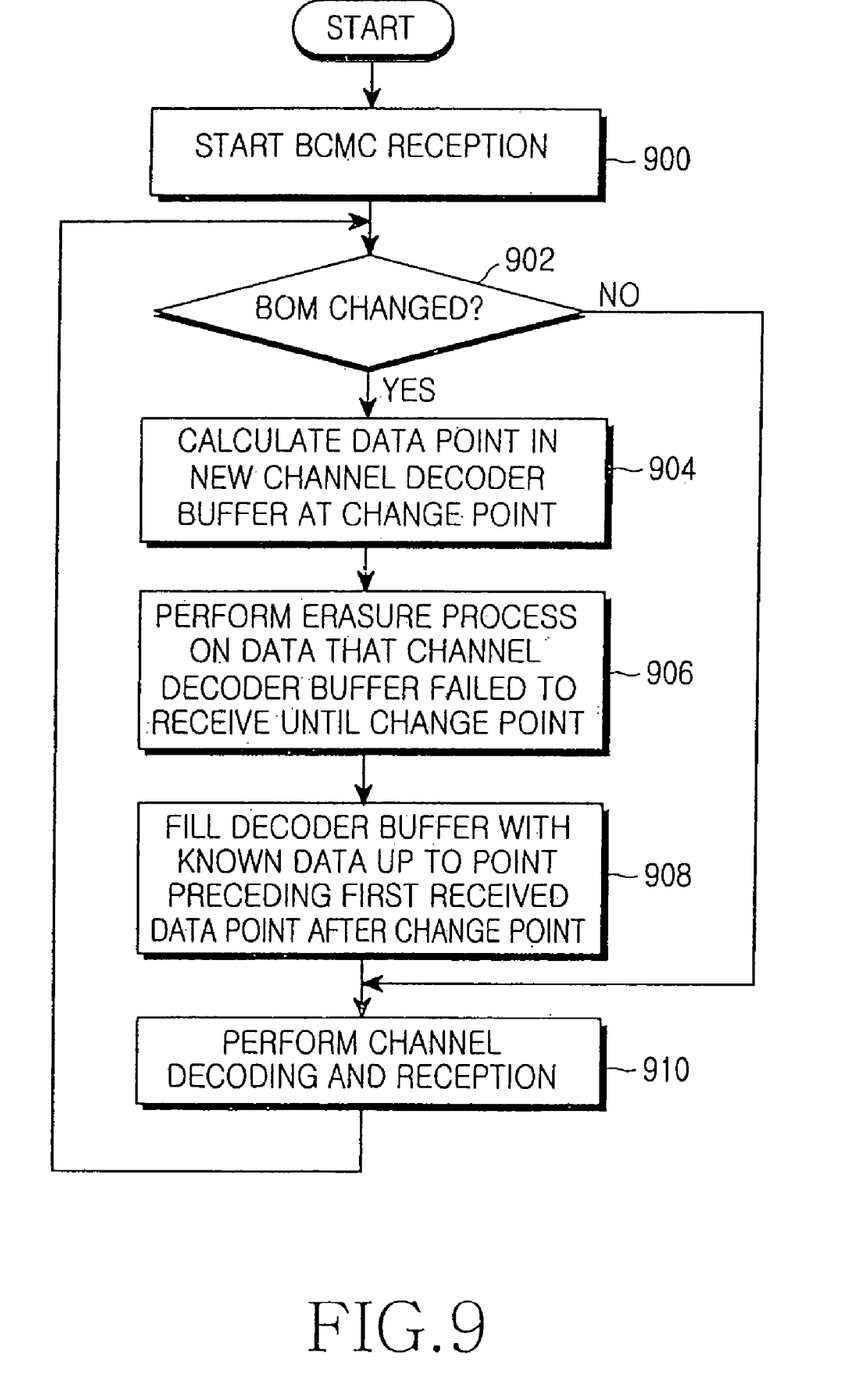
FIG. 9 is a flowchart illustrating an operation of a receiver's controller when a format of an R-S error control block is changed according to an exemplary embodiment of the present invention.

FIG. 9 is a flowchart illustrating an operation of a receiver's controller 608 when a format of an R-S error control block is changed according to an exemplary embodiment of the present invention.

Referring to FIG. 9, a controller 608 starts BCMC reception in step 900, and determines in step 902 whether a BOM is changed. If a determination is made in step 902 that the BOM is changed, the controller 608 calculates data points in a new channel decoder buffer at a point the BOM is changed in step 904. In step 906, the controller 608 performs an ERASURE process on the data that the channel decoder buffer has failed to receive until the change point. Thereafter, in step 908, the controller 608 fills the decoder buffer with KNOWN data 708 up to the point preceding a first received data point in the new channel decoder buffer, immediately after the change point of the BOM. The controller 608 performs channel decoding and reception operations in step 910.

As described above, exemplary embodiments of the present invention provides a format of an R-S error control block that is changed when a BOM is changed. As described below, reference will be made to a second case where the format of the R-S error control block is not changed even though the BOM is changed. The second case where the format of the R-S error control block is not changed before and after the change in the BOM is equal in operation to the case where the format of the R-S error control block is changed when the BOM is changed. In an exemplary implementation, a description with reference to two different cases will be made so exemplary embodiments may be selectively implemented.

The second case where the format of the R-S error control block is not changed, even though the BOM is changed, can be divided again into the following two cases.

In a first case, the packet last transmitted before the change in the BOM precedes a position of the packet first transmitted after the change in the BOM. In a second case, the packet last transmitted before the change in the BOM follows a position of the packet first transmitted after the change in the BOM. The first case will be described with reference to FIG. 10, and the second case will be described with reference to FIG. 11.

Figure 10:
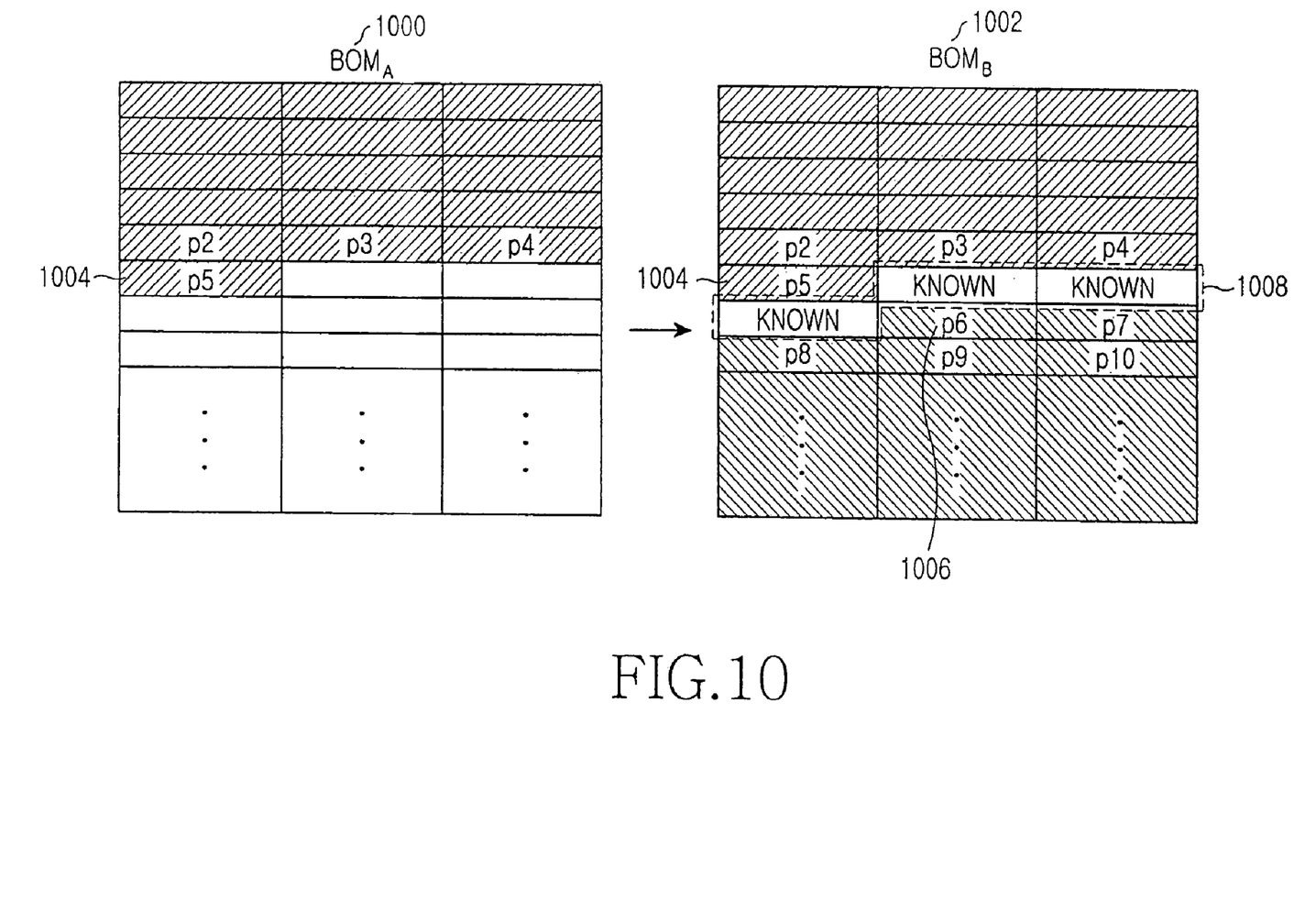
FIG. 10 is a diagram illustrating a data area for a first case where the packet last transmitted before the change in the BOM precedes a position of the packet first transmitted after the change in the BOM in a wireless communication system according to an exemplary embodiment of the present invention.

FIG. 10 is a diagram illustrating a data area for the first case where the packet last transmitted before the change in the BOM precedes a position of the packet first transmitted after the change in the BOM in a wireless communication system according to an exemplary embodiment of the present invention.

Referring to FIG. 10, in a transmitter, a position of a p5 packet 1004 last transmitted before a change in a BOM from $BOM_A$ 1000 to $BOM_B$ 1002 precedes a position of a p6 packet 1006 first transmitted after the change in the BOM. A data area after the change in the BOM to the $BOM_B$ 1002, which is denoted by a KNOWN area 1008, undergoes a coding process with the predefined bits in the transmitter (for example, the data area is filled with '0's). An area following the p6 packet 1006, which is an area following the KNOWN area 1008, is then delivered to the receiver. The receiver fills the decoder buffer with KNOWN data in the interval ranging from the point following the p5 packet 1004 last transmitted according to the $BOM_A$ 1000 before the change in the BOM to the point preceding the p6 packet 1006 first transmitted after the change in the BOM to the $BOM_B$ 1002.

Figure 11:
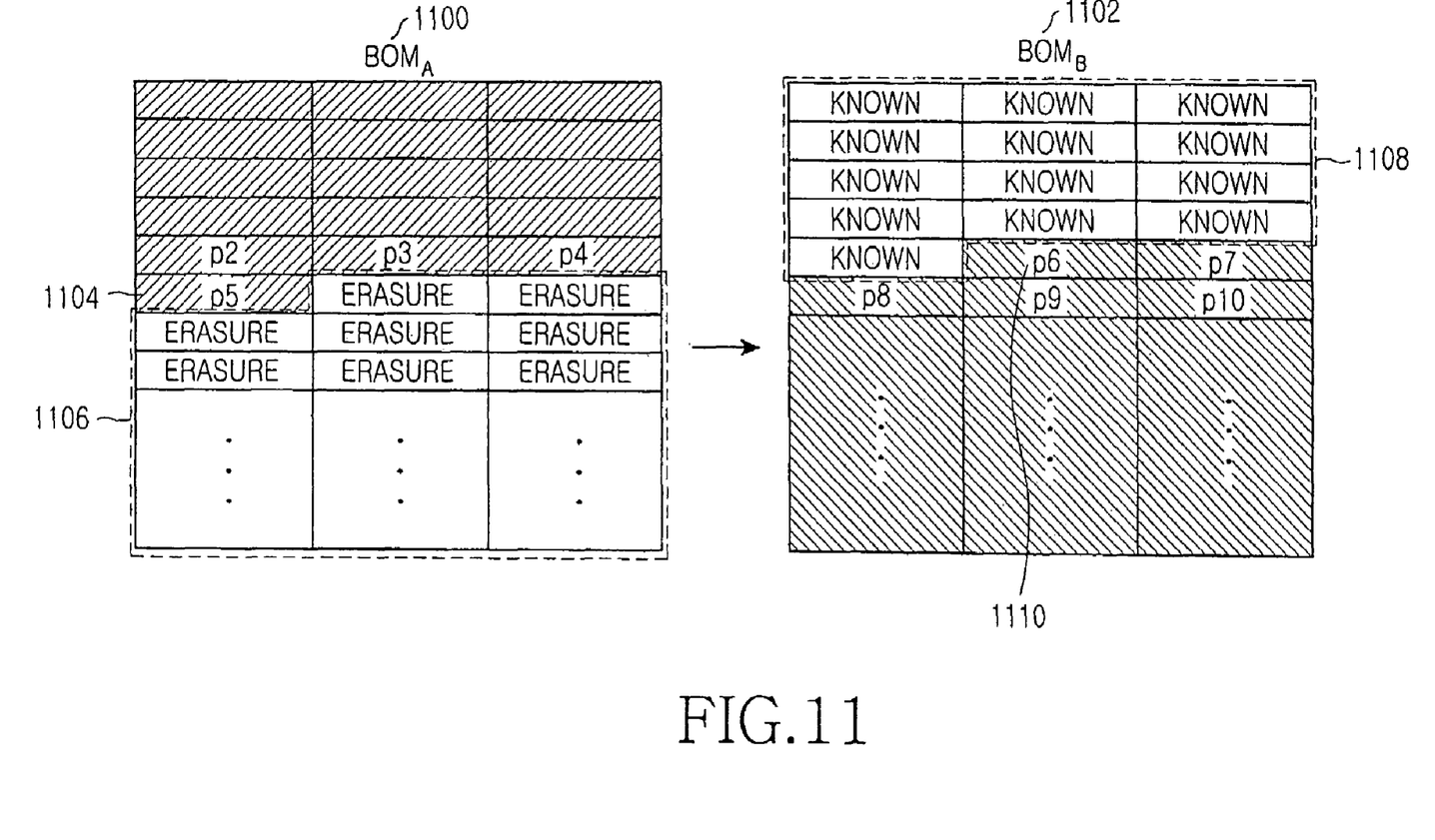
FIG. 11 is a diagram illustrating a data area for a second case where the packet last transmitted before the change in the BOM follows a position of the packet first transmitted after the change in the BOM in a wireless communication system according to an exemplary embodiment of the present invention.

FIG. 11 is a diagram illustrating a data area for the second case where the packet last transmitted before the change in the BOM follows a position of the packet first transmitted after the change in the BOM in a wireless communication system according to an exemplary embodiment of the present invention.

Referring to FIG. 11, in the transmitter, a position of a p5 packet 1104 last transmitted before a change in the BOM from $BOM_A$ 1100 to $BOM_B$ 1102 follows a position of a p6 packet 1110 first transmitted after the change in the BOM. The transmitter fills an encoder buffer with KNOWN data up to the position preceding the p6 packet 1110 first transmitted after the change in the BOM. The receiver fills the decoder buffer with KNOWN data up to the position preceding the p6 packet 1110 first received after the change in the BOM, for the portion where the packet positions overlap after the change in the BOM from $BOM_A$ 1100 to $BOM_B$ 1102, before performing decoding.

Figure 12:
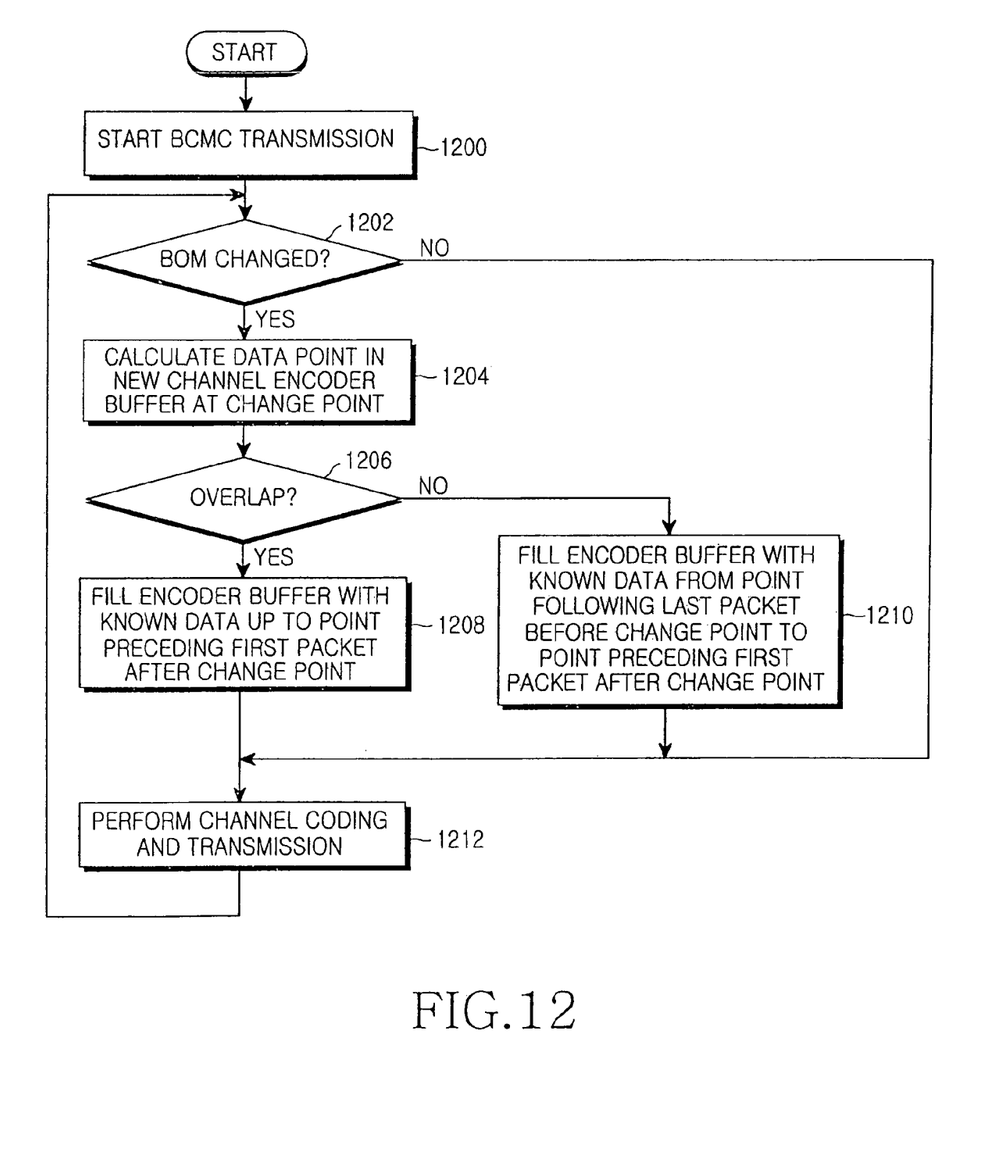
FIG. 12 is a flowchart illustrating an operation of a transmitter's controller when a format of an R-S error control block is changed according to an exemplary embodiment of the present invention.

FIG. 12 is a flowchart illustrating an operation of a transmitter's controller 508 when a format of an R-S error control block is changed according to an exemplary embodiment of the present invention.

Referring to FIG. 12, a controller 508 of a transmitter starts BCMC transmission in step 1200, and determines in step 1202 whether a BOM is changed. If a determination is made in step 1202 that the BOM is changed, the controller 508 calculates in step 1204 data points in a new channel encoder buffer at the change point of the BOM. The controller 508 determines in step 1206 whether the data before the change in the BOM overlaps with the data after the change in the BOM. If the data before and after the change in the BOM overlaps each other in step 1206, the controller 508 proceeds to step 1208 where the controller 608 fills an encoder buffer with KNOWN data 1108 up to the position preceding a p6 packet 1110 first transmitted after the change in the BOM. However, if the data before and after the change in the BOM does not overlap each other in step 1206, the controller 508 proceeds to step 1210 where the controller 608 fills the encoder buffer with the KNOWN data 1008 in the interval ranging from the point following the p5 packet 1004 last transmitted before the change in the BOM to the point preceding the p6 packet 1006 first transmitted after the change in the BOM, while maintaining the encoder buffer. The controller 508 performs channel coding and transmission operations in step 1212.

Figure 13:
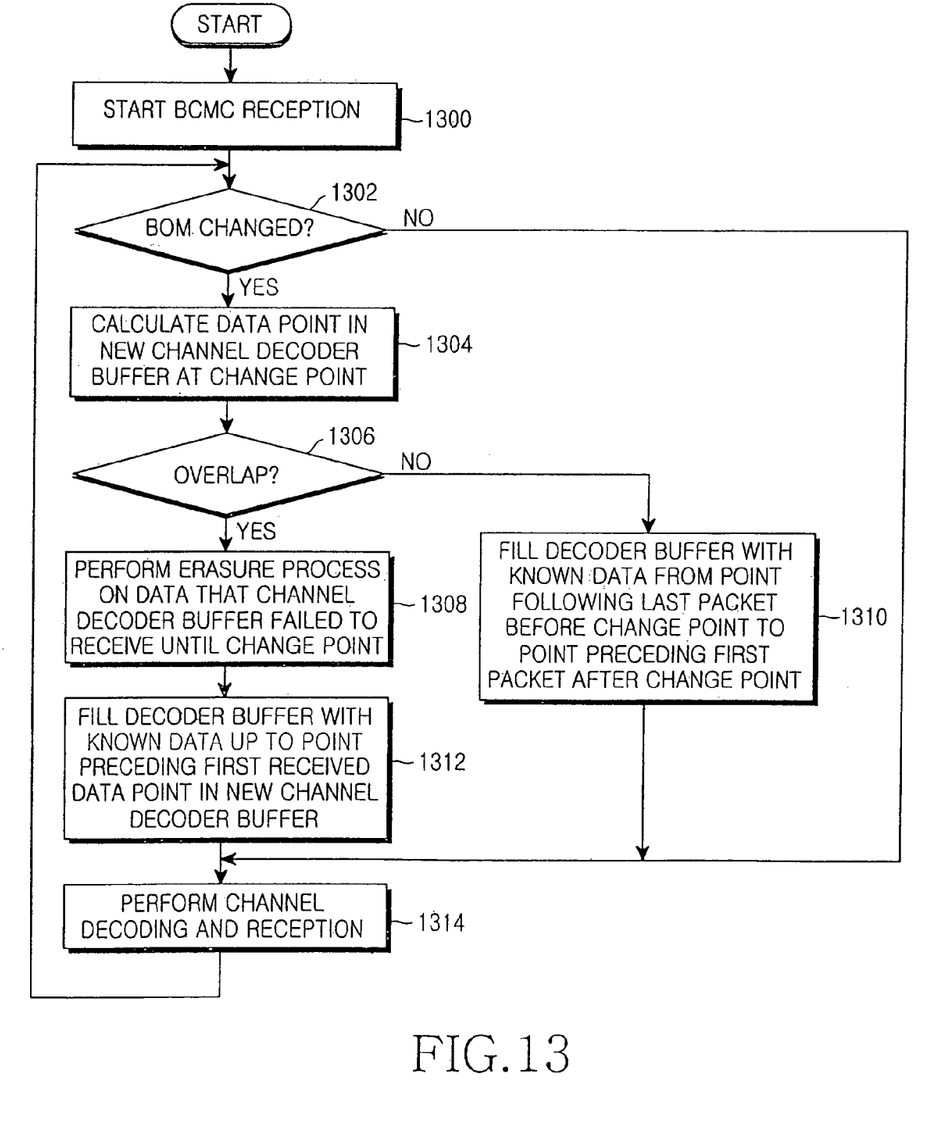
FIG. 13 is a flowchart illustrating an operation of a receiver's controller when a format of an R-S error control block is changed according to an exemplary embodiment of the present invention.

FIG. 13 is a flowchart illustrating an operation of a receiver's controller 608 when a format of an R-S error control block is changed according to an exemplary embodiment of the present invention.

Referring to FIG. 13, a controller 608 starts BCMC reception in step 1300, and determines in step 1302 whether a BOM is changed. If a determination is made in step 1302 that the BOM is changed, the controller 608 calculates data points in a new channel decoder buffer at the change point of the BOM in step 1304. The controller 608 determines in step 1306 whether the data before the change in the BOM overlaps with the data after the change in the BOM. If the data before and after the change in the BOM overlaps each other in step 1306, the controller 608 proceeds to step 1308 where it performs an ERASURE process on the data that the channel decoder buffer has failed to receive until the change point. After the ERASURE process, the controller 608 proceeds to step 1312 where the controller 608 fills the decoder buffer with KNOWN data 1108 up to a point preceding a p6 packet 1110 which is the first received data in the new channel decoder buffer, immediately after the change point of the BOM. However, if the data before and after the change in the BOM does not overlap each other in step 1306, the controller 608 proceeds to step 1310 where the controller 608 fills the decoder buffer with KNOWN data 1108 in the interval ranging from the point following the p5 packet 1004 last transmitted before the change in the BOM to the point preceding the p6 packet 1006 first transmitted after the change in the BOM, while maintaining the encoder buffer. The controller 608 then performs channel decoding and reception operations in step 1314.

As can be understood from the foregoing description, exemplary embodiments of the present invention improves positions of information data being sequentially input to an R-S encoder when a portion of coded data cannot be transmitted, thereby preventing a loss of information data and improving performance. The exemplary embodiments of the present invention, when applied to a BCMC system, improve a data loss interval caused by the change in TDM channel information, thereby maximizing channel performance.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for performing data buffering for Reed-Solomon (R-S) coding in a transmitter of a mobile communication system supporting a broadcast and multicast (BCMC) service, the method comprising:
   determining whether a format change exists in a broadcast overhead message (BOM) comprising information of a position of data for the BCMC service;
   calculating a change position of data in a block buffer at a time when the BOM is changed; and
   filling the block buffer with predetermined data ranging from a start point of the block buffer to the calculated changed position of data first transmitted according to the changed BOM.

2. The method of claim 1, wherein the predetermined data filled in the block buffer comprises a bit predefined by the transmitter and a receiver supporting the BCMC service.

3. The method of claim 1, further comprising, determining whether data before a TDM (Time Division Multiplexing) information change in the BOM overlaps with data after the TDM information change in the BOM; and
   if the data before and after the TDM information change in the BOM does not overlap each other, filling the block buffer with the predetermined data ranging from a point following a point of data last transmitted to a block buffer before the TDM information change in the BOM to the calculated changed position of data first transmitted to the block buffer after the TDM information change in the BOM, while maintaining the block buffer.

4. An apparatus for performing data buffering for Reed-Solomon (R-S) coding in a transmitter including an outer encoder for encoding logical channel bits into logical channel symbols for a mobile communication system supporting a broadcast and multicast (BCMC) service, the apparatus comprising:
   a block buffer for buffering data; and
   a controller for determining whether a format change exists in a broadcast overhead message (BOM) comprising information of a position of data for the BCMC service, calculating a change position of data in a the block buffer at a time when the BOM is changed, and filling the block buffer, immediately after a change point in the BOM, with predetermined data ranging from a start point of the block buffer to the calculated changed position of data first transmitted according to the changed BOM.

5. The apparatus of claim 3, wherein the predetermined data filled in the block buffer comprises a bit predefined by the transmitter and a receiver supporting the BCMC service.

6. The apparatus of claim 4, wherein the controller is further configured to determine whether data before a TDM (Time Division Multiplexing) information change in the BOM overlaps with data after the TDM information change in the BOM, if the data overlaps each other, fill the block buffer with the predetermined data in the first interval after performing the erasure process, and if the data before and after the change in the BOM does not overlap each other, fill the block buffer with the predetermined data ranging from a point following a point of data last transmitted to the block buffer before the TDM information change in the BOM to the calculated changed position of data first transmitted to the block buffer after the TDM information change in the BOM, while maintaining the block buffer.

7. A method for performing data buffering for Reed-Solomon (R-S) decoding in a receiver of a mobile communication system supporting a broadcast and multicast (BCMC) service, the method comprising:
   determining whether a format change exists in a broadcast overhead message (BOM) comprising information of a position of data for the BCMC service;
   calculating a position of data in a block buffer at a time when the BOM is changed;
   performing an erasure process, until the change point of the BOM, on data that a the block buffer failed to receive; and
   filling the block buffer, immediately after the format change in the BOM, with predetermined data ranging from a start point of the block buffer to the calculated changed position of data first received according to the changed BOM.

8. The method of claim 7, wherein the predetermined data comprises a bit predefined by a transmitter and the receiver supporting the BCMC service.

9. The method of claim 7, further comprising,
   determining whether data before a TDM (Time Division Multiplexing) information change in the BOM overlaps with data after the TDM information change in the BOM; and
   if the data before and after the TDM information change in the BOM does not overlap each other, filling the block buffer with data ranging from a point following a point of data last received in the block buffer before the TDM information change in the BOM to the calculated changed position of data first received in the block buffer after the TDM information change in the BOM, while maintaining the block buffer without the erasure process.

10. An apparatus for performing data buffering for Reed-Solomon (R-S) decoding in a receiver including an outer decoder for decoding at least one logical channel symbol into at least one logical channel bit for a mobile communication system supporting a broadcast and multicast (BCMC) service, the apparatus comprising:
   a block buffer for buffering data; and
   a controller for determining whether a format change exists in a broadcast overhead message (BOM) comprising information of a position of data for the BCMC service, calculating a position of data in the block buffer at a time when the BOM is changed, performing an erasure process, until a change point of the BOM, on data that the block buffer failed to receive and filling the block buffer, immediately after the change point in the BOM, with predetermined data ranging from a start point of the block buffer to the calculated changed position of data first received according to the changed BOM.

11. The apparatus of claim 10, wherein the predetermined data comprises a bit predefined by a transmitter and the receiver supporting the BCMC service.

12. The apparatus of claim 10, wherein the controller is further configured to determine whether data before a TDM (Time Division Multiplexing) information change in the BOM overlaps with data after the TDM information change in the BOM, if the data overlaps each other, fill the block buffer with the predetermined data in the first interval after performing the erasure process, and if the data before and after the change in the BOM does not overlap each other, fill the block buffer with the predetermined data ranging from a point following a point of data last received in the block buffer before the TDM information change in the BOM to the calculated changed position of data first received in the block buffer after the TDM information change in the BOM without the erasure process, while maintaining the block buffer.

* * * * *